(12) United States Patent
Sherony et al.

(10) Patent No.: US 11,328,602 B2
(45) Date of Patent: May 10, 2022

(54) SYSTEM AND METHOD FOR NAVIGATION WITH EXTERNAL DISPLAY

(71) Applicant: Toyota Motor Engineering & Manufacturing North America, Inc., Plano, TX (US)

(72) Inventors: Rini Sherony, Ann Arbor, MI (US); Paxton S. Williams, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 175 days.

(21) Appl. No.: 16/597,076

(22) Filed: Oct. 9, 2019

(65) Prior Publication Data
US 2021/0110715 A1 Apr. 15, 2021

(51) Int. Cl.
*G08G 1/16* (2006.01)
*G06K 9/00* (2022.01)
(Continued)

(52) U.S. Cl.
CPC .......... *G08G 1/166* (2013.01); *B60R 11/0235* (2013.01); *G06K 9/00805* (2013.01); *G06K 9/6289* (2013.01); *G06T 7/20* (2013.01); *G06T 7/55* (2017.01); *B60R 2011/004* (2013.01); *G05D 1/0214* (2013.01); *G05D 1/0231* (2013.01); *G05D 2201/0213* (2013.01); *G06T 2207/10028* (2013.01); *G06T 2207/30241* (2013.01); *G06T 2207/30261* (2013.01)

(58) Field of Classification Search
CPC .............. B60W 30/09; B60W 30/095; B60W 60/0015; B60W 60/00272; G05D 1/0212; G05D 1/0214; G05D 1/0231; G05D 1/0246; G05D 2201/0213; G06K 9/00805; G06K 9/6289; G08G 1/166
See application file for complete search history.

(56) References Cited

U.S. PATENT DOCUMENTS 10,129,521 B2   11/2018   Einecke et al.
2017/0287338 A1 10/2017   Neubecker et al.
(Continued)

OTHER PUBLICATIONS

Nassi et al. "Phantom of the ADAS: Securing Advanced Driver-Assistance Systems from Split-Second Phantom Attacks", CCS '20, Nov. 9-13, 2020, Virtual Event, USA (Year: 2020).*
(Continued)

*Primary Examiner* — William C Vaughn, Jr.
*Assistant Examiner* — Naod W Belai
(74) *Attorney, Agent, or Firm* — Christopher G. Darrow; Darrow Mustafa PC

(57) ABSTRACT

System, methods, and other embodiments described herein relate to selecting a route for a vehicle to travel. In one embodiment, the detection system generates a driving maneuver recommendation for a vehicle having a plurality of sensors configured to acquire information about an environment around the vehicle, the sensors including at least a camera to capture one or more images of a scene within the environment, by determining that at least a portion of each image in a set of images captured by the camera indicates an external display in the environment, tracking an object within the portion of each image in the set of images to determine a state of the object, the state including at least a trajectory estimate for the object, and determining a recommended driving maneuver based at least in part on the determined state of the object.

20 Claims, 7 Drawing Sheets

(51) Int. Cl.
| | |
|---|---|
| *G06T 7/20* | (2017.01) |
| *G06K 9/62* | (2022.01) |
| *G06T 7/55* | (2017.01) |
| *B60R 11/02* | (2006.01) |
| *G05D 1/02* | (2020.01) |
| *B60R 11/00* | (2006.01) |

(56) References Cited

U.S. PATENT DOCUMENTS

| | | | |
|---|---|---|---|
| 2017/0355306 A1* | 12/2017 | Bellotti | G08G 1/167 |
| 2018/0181137 A1* | 6/2018 | Choi | G06K 9/3233 |
| 2018/0348780 A1 | 12/2018 | Zheng et al. | |

OTHER PUBLICATIONS

Condliffe, "This Image Is Why Self-Driving Cars Come Loaded with Many Types of Sensors," MIT Technology Review, https://www.technologyreview.com/s/608321/this-image-is-why-self-driving-cars-come-loaded-with-many-types-of-sensors/ (Last accessed Sep. 18, 2019).

Zhou & Tuzel, "VoxelNet: End-to-End Learning for Point Cloud Based 3D Object Detection," arXiv:1711.06396v1 [cs.CV] Nov. 17, 2017.

Teichman et al., "Towards 3D Object Recognition via Classification of Arbitrary Object Tracks," IEEE International Conference on Robotics and Automation, 9 pages (2011).

\* cited by examiner

SYSTEM AND METHOD FOR NAVIGATION WITH EXTERNAL DISPLAY

TECHNICAL FIELD

The subject matter described herein relates, in general, to systems and methods for navigating an autonomous or semi-autonomous vehicle, and, more particularly, to navigating the vehicle based at least in part on information obtained from an external display.

BACKGROUND

Autonomous vehicles and driver-assist systems in vehicles may be equipped with multiple sensors that enable the vehicles to detect information about the surrounding environment, navigate in the environment, detect and avoid obstacles, and other functions. In certain situations, however, areas of the environment may be obscured from the line of sight of the sensors. For example, a truck trailer can block a view of the opposite lane of traffic or a view of an upcoming intersection.

A truck trailer, or other large vehicle, can be equipped with an external display on one side that shows a view of an opposing side. This essentially allows an approaching or passing driver to "see through" to the trailer and be informed of the status of the obstructed side. While such a display is useful to human drivers, it can present unique challenges for autonomous and semi-autonomous systems.

SUMMARY

The disclosed systems and methods relate to a manner of improving the operation of a vehicle, particularly an autonomous vehicle or a vehicle that includes autonomous or semi-autonomous features that rely on sensor data, by detecting the presence of an external display in the vicinity of the vehicle, identifying and tracking objects based on information provided by the display, determining a state of the objects and whether the objects are obscured from direct detection, and determining an appropriate driving maneuver recommendation based at least in part on the state of the objects.

In one embodiment, a detection system of a vehicle includes a plurality of sensors configured to acquire information about an environment around the vehicle, the plurality of sensors including a camera to capture images of a scene within the environment, one or more processors, and a memory communicably coupled to the one or more processors. The memory can store a detection module including instructions that when executed by the one or more processors cause the one or more processors to determine that at least a portion of each image in a set of images captured by the camera indicates an external display in the environment, a tracking module including instructions that when executed by the one or more processors cause the one or more processors to track an object within the portion of each image in the set of images and determine a state of the object, the state including at least a trajectory estimate for the object, and a drive module including instructions that when executed by the one or more processors cause the one or more processors determine a recommended driving maneuver based at least in part on the determined state of the object.

In another embodiment, a method of generating a driving maneuver recommendation for a vehicle having a plurality of sensors configured to acquire information about an environment around the vehicle, the sensors including at least a camera to capture one or more images of a scene within the environment, includes determining that at least a portion of each image in a set of images captured by the camera indicates an external display in the environment, tracking an object within the portion of each image in the set of images to determine a state of the object, the state including at least a trajectory estimate for the object, and determining a recommended driving maneuver based at least in part on the determined state of the object.

In another embodiment, a non-transitory computer-readable medium for generating a driving maneuver recommendation for a vehicle having a plurality of sensors configured to acquire information about an environment around the vehicle, the sensors including at least a camera to capture one or more images of a scene within the environment, include instructions that, when executed by one or more processors, cause the one or more processors to determine that at least a portion of each image in a set of images captured by the camera indicates an external display in the environment, track an object within the portion of each image in the set of images to determine a state of the object, the state including at least a trajectory estimate for the object, and determine a recommended driving maneuver based at least in part on the determined state of the object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with navigating a vehicle based at least in part on information obtained from an external display are disclosed. As mentioned previously, a vehicle may be equipped with one or more sensors that obtain information that aids the vehicle in carrying out various functions, e.g., related to navigation or providing driving aid. For example, a camera sensor can generate data used to detect one or more objects in an environment around the vehicle (e.g., other vehicles, pedestrians, buildings, etc.), a radar or lidar sensor can generate data that indicates a distance to the one or more objects, and so on.

A large vehicle, such as a truck or a trailer of a truck, can include an external display on one or more sides or the back of the vehicle, for example, to periodically display advertisements, public information, or the like. Such large vehicles can significantly obstruct the view of other vehicles sharing the road. To mitigate against this, one or more cameras can be disposed on the large vehicle to capture a view of the environment in a direction that is opposite of the side/back having the external display. The external display can be configured to show the view in what will be referred to herein as a "see-through" mode. The see-through mode can be activated, for example, when the large vehicle comes to a stop, when the external display is otherwise unused, or at other times. While see-the through mode is activated, another vehicle positioned on the display-side of the large vehicle can essentially "see through" the large vehicle and view at least some of the environment that would otherwise be obstructed by the large vehicle.

Figure 3:
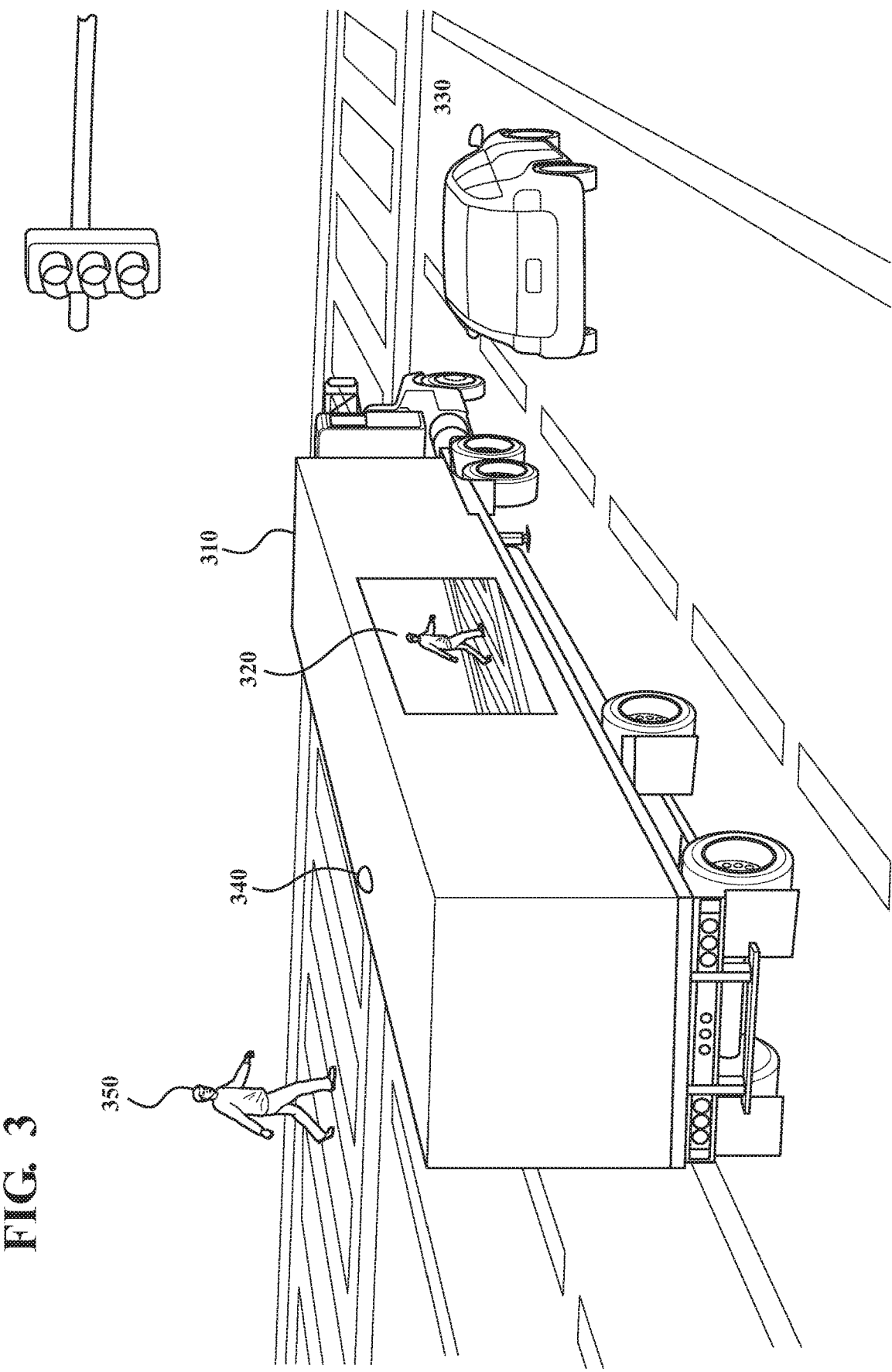
FIG. 3 illustrates an example scenario of a vehicle detecting an external display according to the disclosed embodiments.

FIG. 3 shows an example scenario of a see-through mode activated on a trailer of a truck 310. While the truck 310 and the vehicle 330 are stopped at the light, the truck 310 obstructs the view of a pedestrian 350 from the perspective of the vehicle 330. Accordingly, an external display 320 shows a view captured by a camera 340, thereby informing the vehicle 310 of the presence of the pedestrian 350.

A see-through mode can inform a human driver of what is occurring in a region of the environment that is obstructed from the point of view of the driver. For example, a driver stopped at an intersection and intending to make a right turn can utilize the see-through mode of an external display to check whether the driver is clear to turn or whether other vehicles are entering the intersection and the driver must wait until the other vehicles pass by. In another example, a driver stopped at an intersection and preparing to proceed through the intersection can check whether a cyclist is crossing the intersection before advancing ahead.

While a human driver can immediately and effectively interpret information received from a see-through mode of an external display and make a correct decision based thereon, autonomous and semi-autonomous vehicles can misinterpret the nature or relative positioning of objects shown within the external display.

Therefore, a detection system and associated methods are disclosed herein that can evaluate camera and sensor data to identify when the data indicate the presence of an external display in the vicinity, interpret the corresponding data and determine a driving maneuver recommendation according to the interpretation of the data. As will be discussed below, various factors can impact the interpretation of the data and the associated recommendation, and the disclosed detection system can take these factors into account in determining how an autonomous or semi-autonomous vehicle responds in different situations.

The disclosed detection system covers a multitude of potential driving scenarios but can be broadly understood to operate in a generally two-part analysis process: 1) determine whether a part of the scene in the information captured by sensors includes an external display, and 2) when an external display is present, determine how much information can be interpreted from the display itself and from any available secondary information related to the information in the display to determine a driving maneuver recommendation. Each part includes different possible variations and subroutines, as will be discussed further below.

Figure 1:
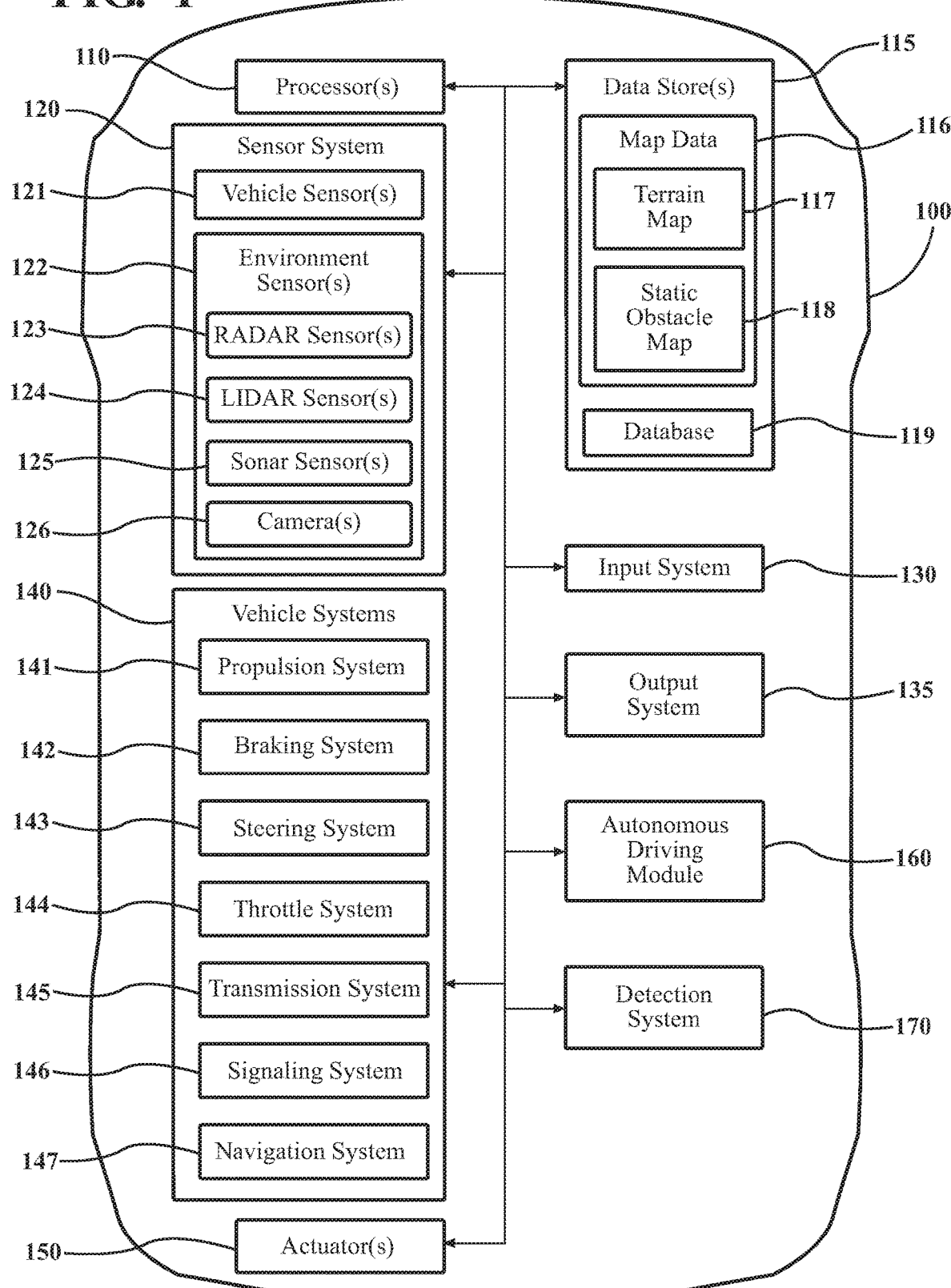
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, is equipped with sensors to perceive aspects of the surrounding environment, and thus benefits from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-9 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a detection system 170 that is implemented to perform methods and other functions as disclosed herein relating to identifying external displays, interpreting data from an environment that includes an external display and determining driving maneuver recommendations based at least in part on the interpretation. The noted functions and methods will become more apparent in the following discussion of the figures.

Figure 2:
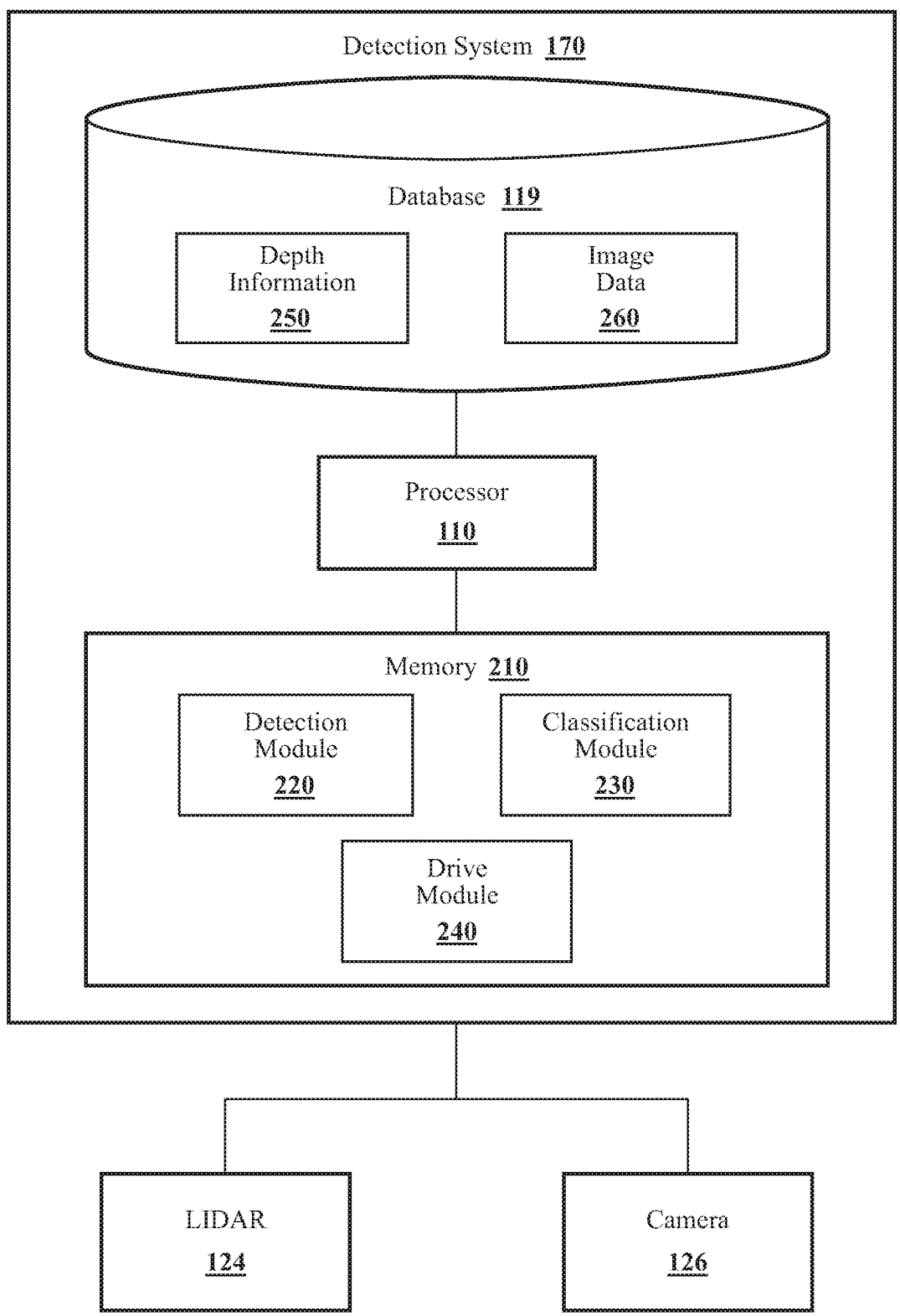
FIG. 2 illustrates one embodiment of a detection system according to the disclosed embodiments.

With reference to FIG. 2, one embodiment of the detection system 170 of FIG. 1 is illustrated. The detection system 170 is shown as including a processor 110 and database 119 from the vehicle 100 of FIG. 1. Accordingly, the processor 110 may be a part of the detection system 170, the detection system 170 may include a processor separate from the processor 110 of the vehicle 100 or the detection system 170 may access the processor 110 through a data bus or another communication path.

In one embodiment, the detection system 170 is operably connected with one or more vehicle sensors that capture images (which can include both still images and video images) and depth information. The disclosed embodiments will be described based on an implementation including a LIDAR 124 and a vehicle camera 126 (e.g., a CCD image sensor, a CMOS image sensor, or other imager device). It should be understood however, that other implementations are possible using different types of sensors that can obtain image and depth information, such as, radar sensors, infrared sensors, etc.

The detection system 170 includes a database 119 that stores, among other things, depth information 250 (e.g., depth images captured by LIDAR 124) and corresponding image data 260 (e.g., images/video frames captured by camera 126), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

Additionally, the detection system 170, in one embodiment, includes a memory 210 that stores a detection module 220, a tracking module 230, and a drive module 240. The memory 210 can be constructed as a random-access memory (RAM), read-only memory (ROM), a hard-disk drive, a flash memory, or other suitable memory for storing the modules 220, 230 and 240. The modules 220, 230 and 240 are, for example, constructed as computer-readable instructions that when executed by the processor 110 cause the processor 110 to perform the various functions disclosed herein.

The detection module 220 is generally constructed including instructions that function to control the processor 110 to analyze sensor data and determine whether an external display is detected within the vicinity of the vehicle 100. In one or more embodiments, the detection module 220 detects the presence of an external display by analyzing one or more images captured by the camera 126 to identify objects and determine estimates for spatial positioning and/or dimensionality of identified objects, and attempting to determine whether corresponding information captured by the LIDAR 124 confirms the estimated spatial positioning and/or dimensionality of identified objects.

Accordingly, the LIDAR 124 and camera 126 can be synchronized to capture corresponding information regarding the environment around the vehicle 100. For example, in one or more embodiments the LIDAR 124 and the camera 126 can operate in spatial and/or temporal synchronization. That is, the camera 126 can capture images in a field-of-view (FOV) overlapping or coinciding with a FOV of the LIDAR 124. The camera 126 can further capture individual images of the FOV at substantially the same time that the LIDAR 124 captures depth information of the same FOV. The captured image data 260 and corresponding depth information 250 can be stored in the database 119 timestamped and/or otherwise in association with each other, e.g., using labels, metadata tags, arrays, or other methods of association.

Figure 4:
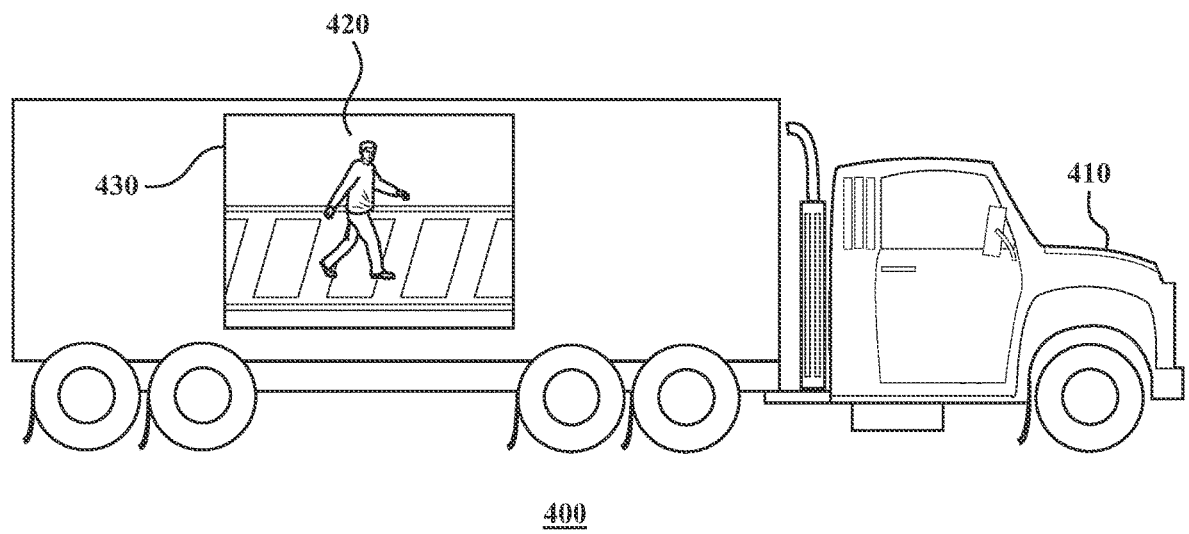
FIG. 4 illustrates an example image capture of an external display according to the disclosed embodiments.

FIG. 4 shows an example image 400 captured by camera 126. The detection module 220 can process the image 400 to detect and track one or more objects. For example, the detection module 220 may execute an image analysis algorithm to detect an object 420 (e.g., a pedestrian) shown within the display 430 and track the position and/or movement of the object 420 across multiple captured images or video.

One of the challenges in attempting to replicate human judgment is handling interpretation of information from compound data, such as information presented in an external display that is captured in an image. The position of and distance to the external display itself as a physical object can be considered one layer of information, while the information projected within the external display can be considered a distinctly different layer of information. A human driver can correctly distinguish the layers and take appropriate responsive action. That is, for example, a human driver can readily recognize that the pedestrian shown in the display 430 is not located beside the vehicle 100 as it appears, but instead correctly derive, based on an understanding of the nature of the external display, that the pedestrian is actually located in a position beyond the truck 410. In contrast, a conventional autonomous or semi-autonomous object detection system may not distinguish the layers of information, but instead interpret the information as a singular layer and thereby misinterpret the position of the pedestrian based on the image 400. For example, the conventional autonomous object detection system may incorrectly determine that one or more objects moving in the external display 430 are moving directly alongside the vehicle 100 rather than beyond the truck 410, or may otherwise draw an incorrect or indeterminate conclusion based on the data. In the case of autonomous vehicles, an incorrect interpretation of object position data can lead to a responsive maneuver that results in a potentially dangerous collision.

Figure 5:
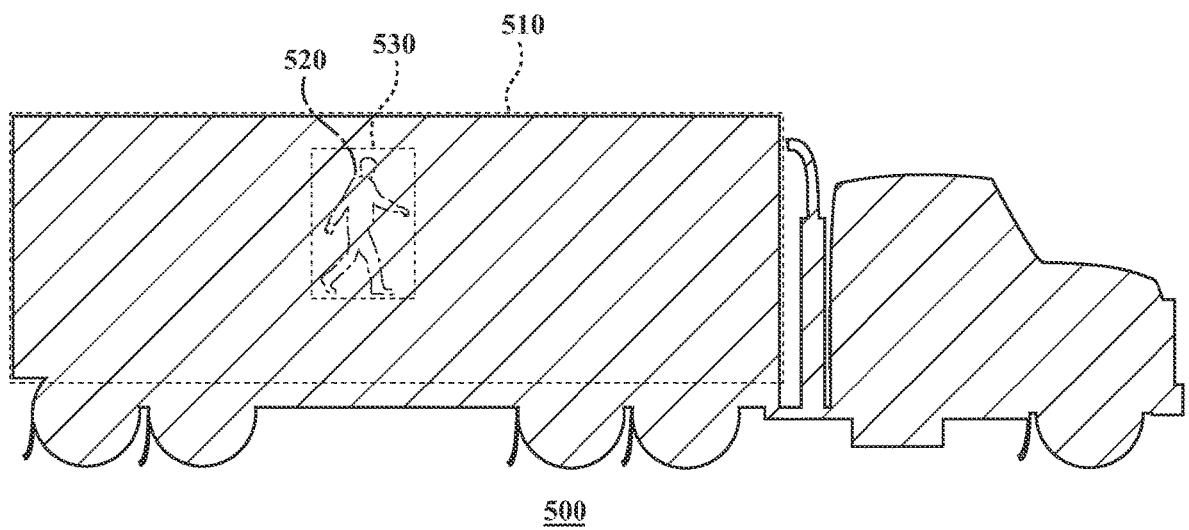
FIG. 5 illustrates an example depth image according to the disclosed embodiments.

Advantageously, the disclosed detection module 220 can analyze image data 260 to determine whether multiple layers of information are present. For example, in one or more embodiments, the detection module 220 can analyze depth information 250 that corresponds with the image data 260. FIG. 5 shows an example depth image 500 that corresponds (e.g., spatially, temporally) with image 400. The depth image 500 can be captured by LIDAR 124 and can contain information that indicates distances of object surfaces from a viewpoint, e.g., of the vehicle 100. Since depth information is not based on light detection, the depth image 500 does not capture any indication of any objects (e.g., object 420) that may be shown in the external display 430. Accordingly, the depth image 500 can be used to detect a first layer of information, i.e., actual physical presence. In the example situation depicted in FIG. 5, the depth image 500 indicates that a physical, flat surface 510 is present in the position 520 corresponding to where the object 420 (pedestrian) was detected in the image 400.

Generally, by comparing the object detection results of the image analysis with the actual physical object detection results of the depth analysis, the detection module 220 can determine whether the image data includes multiple layers of information. When multiple layers of information are detected, the detection module 220 can determine that at least a portion in each image in a set of images captured by the camera 126 indicates a flat surface external display in the environment.

In one or more embodiments, the detection module 220 comparison includes determining that a depth image indicates a relatively flat, physical surface is present in a region where, compared against the image data 260, the image data 260 indicate that a detected object should be disposed. When the object detected in the image analysis differs in size and/or shape from the corresponding region in a depth image above a threshold amount, the detection module 220 can determine that at least a portion of the depth image in the specific region of the detected object corresponds to an external display. For example, since the position 520 corresponds with a flat surface 510 in the depth image 500, and the shape of the object 420 differs significantly from the shape of the local flat surface 510 indicated by the depth image 500, the detection module 220 can determine that at least a portion of image 400 is an external display, and more specifically, at least a portion in the area 530 that is in the immediate vicinity of the position 520.

The detection module 220 can learn more about the attributes of the detected external display by analyzing a set of images spanning an interval of time during which the flat surface 510 is detected. The detected external display likely does not occupy the entirety of the flat surface 510, but instead a portion of it. Initially, the area 530 is known to be at least within the external display. Accordingly, the detection module 220 can expand the area 530 based on detecting other corresponding image objects located on the flat surface 510, or based on tracking the object 420, or another object, moving within the flat surface 510. Accordingly, the detection module 220 can refine and improve the estimated area 530 of the external display within the flat surface 510 to improve detection and interpretation of second layer information (i.e., information contained within the external display).

In one or more embodiments, the detection module 220 can alternatively determine that a portion of a set of images indicates a flat surface display based at least in part on detecting a symbol in the portion of the set of images. For example, an external display can include a designated icon or symbol, e.g., shown in a corner of the display. When the detection module 220 detects the symbol in a captured image, the detection module 220 can determine that at least a portion of the captured image includes an external display. The detection module 220 can determine dimensions of the external display relative to the position of the symbol based on predefined, known data associated with the symbol.

In any case, after an external display has been detected, information presented within the display is appropriately handled in view of the understanding that objects detected therein (i.e., second layer information objects) are, in fact, located at some point a distance beyond the display, relative to the vehicle 100. As will be discussed below, in some instances it is possible to determine an accurate estimate of the exact positioning of second layer information objects, and even when such is not possible useful inferences can still be obtained for the purpose of determining a driving maneuver recommendation.

The tracking module 230 can derive information regarding objects detected within an external display. In one or more embodiments, the tracking module 230 is constructed including instructions that function to control the processor 110 to track an object detected at least partially in a portion of the image determined to be an external display and determine an active state of the object. The active state of the object, as used herein, refers to one or more attributes or characteristics of the object related to the position and/or movement or nonmovement of the object. The tracking module 230 can also include a classifier, such as a trained neural network, to attempt to identify or classify the object (e.g., "car", "pedestrian", "bicycle", etc.)

In one or more embodiments, the active state of the object includes at least a trajectory estimate for the object. In one or more embodiments, the trajectory estimate includes an estimated speed of the object and, when the speed is greater than zero, an estimated direction of movement of the object.

The tracking module 230 can determine the trajectory estimate, for example, by tracking a position of an object in sequential images.

In one or more embodiments, the active state of the object includes at least a distance estimate of the object relative to the vehicle 100. The tracking module 230 can determine a minimum distance between the vehicle 100 and the object by determining a distance between the vehicle 100 and the flat surface of the external display, e.g., based on the depth information captured by the LIDAR 124. When the object is only partially obstructed, the tracking module 230 can determine a more accurate distance based on depth information of the unobstructed portion of the object captured by the LIDAR 124.

Figure 6:
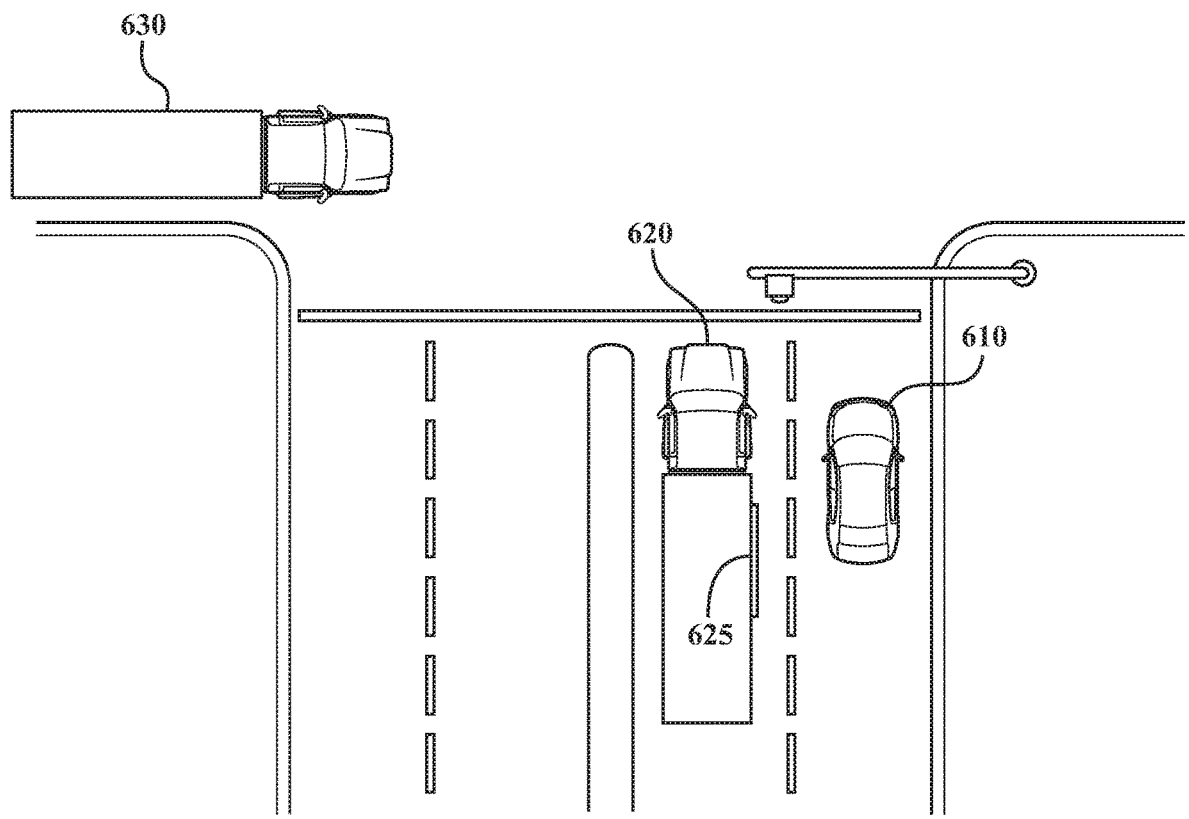
FIG. 6 illustrates another example scenario of a vehicle detecting an external display according to the disclosed embodiments.

As an example trajectory estimate, FIG. 6 shows an overhead view of a scene 600 in which a vehicle 610 (e.g., an autonomous vehicle) and a truck 620 have received a green traffic light signal and are preparing to cross an intersection. A second truck 630 is traveling across the intersection perpendicular to the path of the vehicle 610. For example, the truck 630 may have unexpectedly run a red light. In this instance, the truck 620 obstructs the view of the intersection from the perspective of the vehicle 610. However, the truck 620 includes an external display 625 that shows a view of the intersection, the next lane, and the second truck 630 approaching.

After the detection module 220 detects the presence of the external display 625 showing an object that corresponds to the truck 630, for example, using one of the methods described above, the tracking module 230 can track the position of the object across multiple images. The tracking module 230 can thereby determine a trajectory estimate of the object. For example, the tracking module 230 can analyze sequential captured images and determine that a position of the object is shifting (e.g., from left to right) and a size of the object is increasing. Based on these determinations, the tracking module 230 can determine that the current active state of the object is a state of moving along a trajectory toward the vehicle 610 from a position beyond the display 625.

In some situations the external display itself may be in motion, for example, when a truck having an external display is slowly moving forward in anticipation of a light changing from red to green. Accordingly, in one or more embodiments the tracking module 230 can further track movement of the vehicle on which the external display is mounted, e.g., based on information captured by LIDAR 124, and determine an offset value to apply to the trajectory estimate of an object within the external display.

After an active state has been determined for one or more objects, the drive module 240 can determine a driving maneuver recommendation. As used herein, a driving maneuver refers to a controlled operation of the vehicle, e.g., to adjust speed, trajectory, acceleration/deceleration, steering, brakes, navigational path, etc. In one or more embodiments, the drive module 240 is constructed including instructions that function to control the processor 110 to determine a recommended driving maneuver based at least in part on the determined active state(s) of one or more objects detected within an external display. In one or more embodiments, the drive module 240 can further determine the recommended driving maneuver based on additional factors, such as the current state (speed, trajectory, etc.) of the vehicle, a navigational plan of the vehicle, map data of the local area, vehicle sensor data, data received from other vehicles or systems, preference settings, or other types of information.

In a vehicle with autonomous capability, the drive module 240 can transmit the driving maneuver recommendation to a drive controller that can control the vehicle to automatically execute the maneuver. In a vehicle without autonomous capability, the drive module 240 can generate a notification to communicate the maneuver recommendation to the driver, for example, on a dashboard display screen, via an audible alert, or some other type of communication.

Generally, the drive module 240 can determine the driving maneuver recommendation by executing one or more algorithms that receive at least the object(s) active state(s) as input and determine a driving maneuver to: 1) avoid a collision when the active state(s) indicate a threshold likelihood of a potential collision, 2) execute limited movement until additional information is obtained when the active state(s) indicate activity of indeterminate result, or 3) proceed with operation as previously planned without alteration when the active state(s) indicate no activity or activity that is determined not to interfere with the vehicle operation.

Referring back to FIG. 6, the drive module 240 may determine that the active state of the object in the external display 625 indicates a likelihood of a potential collision. For example, the drive module 240 algorithm can receive the active state of the object in the external display 625, the object classification, map data, and the current navigational path (e.g., cross the intersection) of the vehicle 610 as input. The drive module 240 algorithm can determine that an object classified as another vehicle is moving toward the vehicle 610 at a high speed (e.g., above a threshold speed), and, based on the map data, that the other vehicle is likely traveling along the cross road that passes through the intersection that the vehicle 610 is currently planning to enter according to the current navigational path of the vehicle 610. Based on these determinations, the drive module 240 can generate a driving maneuver recommendation to stop the vehicle 610 to avoid a potential collision rather than proceed to enter the intersection.

FIGS. 3-5 show an example situation in which the drive module 240 may determine that the active state of the object 420 in the external display 430 indicate activity of indeterminate result. For example, the drive module 240 algorithm can receive the active state of the object 420, the object classification, map data, and the current navigational path (right turn) of the vehicle 330 as input. The drive module 240 algorithm can determine that the object 420 classified as a pedestrian is moving toward the vehicle 610 at a low speed (e.g., below a threshold speed). However, the pedestrian is completely obstructed from direct sensor detection by the vehicle 330. In this circumstance the precise location of the pedestrian relative to the vehicle 330 is unknown. Based on these determinations, the drive module 240 can generate a driving maneuver recommendation to advance the vehicle 610 slowly into the turn (e.g., limited to maximum speed of 3 mph) until more information can be obtained to determine the precise location of the pedestrian relative to the vehicle 330.

Figure 7:
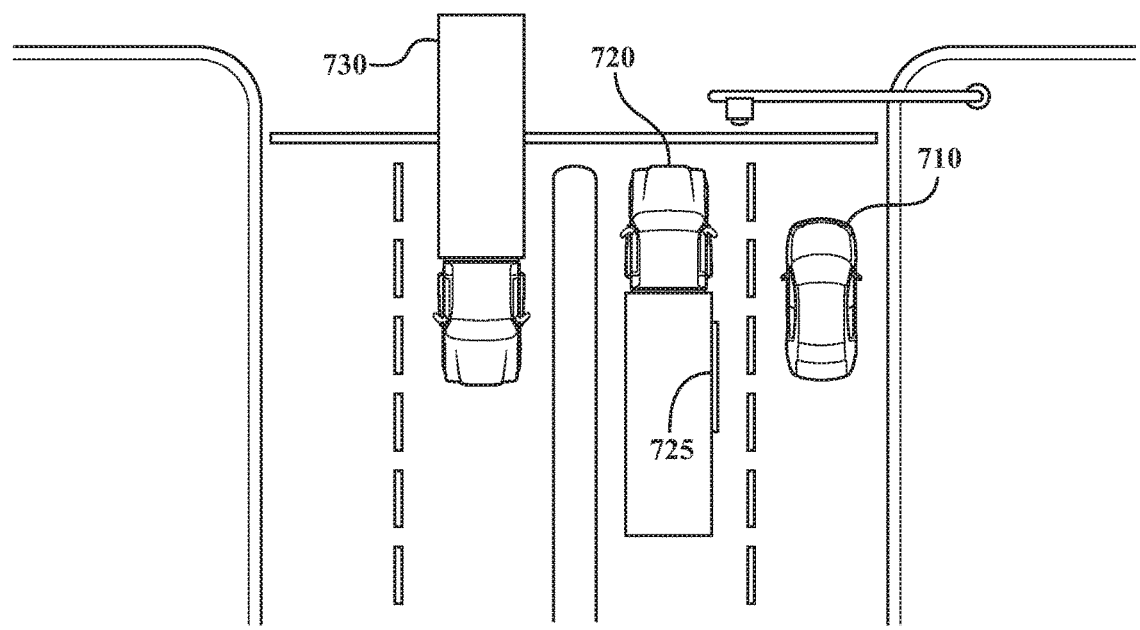
FIG. 7 illustrates yet another example scenario of a vehicle detecting an external display according to the disclosed embodiments.
Figure 8:
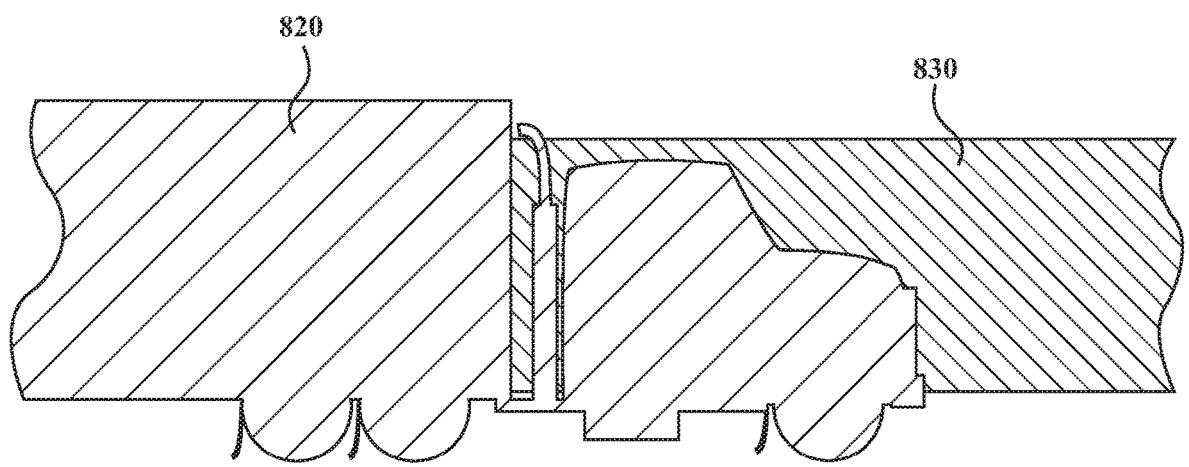
FIG. 8 illustrates another example depth image according to the disclosed embodiments.

FIGS. 7-8 show an example situation in which the drive module 240 may determine that the active state of an object in an external display 430 indicate no activity or activity that is determined not to interfere with the current vehicle operation. FIG. 7 shows an overhead view of a scene 700 in which a vehicle 710 is at an intersection beside a truck 720 that includes an external display 725. The truck 720 partially obstructs a view of a second truck 730, which is also partially displayed in the external display 725. FIG. 8 shows an example depth image 800 of the scene 700 from the perspective of the vehicle 710. Since a direct view of the second truck 730 is only partially obstructed, the depth image captures a region 820 of the truck 720 and a portion 830 of the second truck 730.

The drive module 240 algorithm can receive the active state of the object in the external display 625 (i.e., corresponding to truck 730), object classification, map data, and the current navigational path (e.g., drive forward) of the vehicle 710 as input. In this case, due to the information available from the depth image 800 the tracking module 230 can augment the active state of the object to include the precise location of truck 730, as well as its trajectory. Accordingly, the drive module 240 can determine that a partially obscured object is in the vicinity, however, the object is currently in a position and moving along a trajectory that will not interfere with the current navigational path of the vehicle 710. Thus, the drive module 240 can generate a driving maneuver recommendation to safely proceed through the intersection without any modification to the current planned navigational path.

Figure 9:
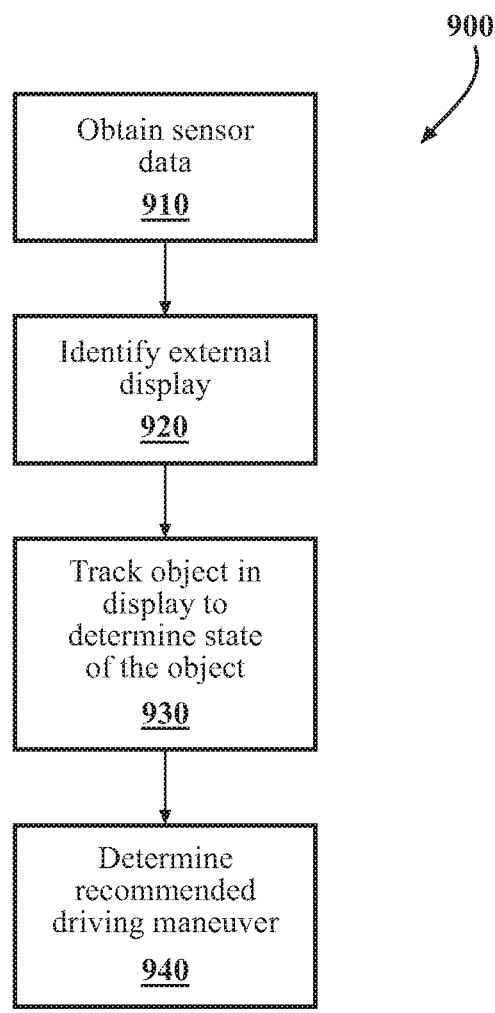
FIG. 9 illustrates a flow chart of a method of detecting an external display and generating a driving maneuver recommendation according the disclosed embodiments.

FIG. 9 illustrates a flowchart of a method 900 of interpreting information from an external display and generating a driving maneuver recommendation according to the disclosed embodiments. Method 900 will be discussed from the perspective of the detection system 170 of FIGS. 1 and 2. While method 900 is discussed in combination with the detection system 170, it should be appreciated that the method 900 is also not limited to being implemented within the detection system 170 but is instead one example of a system that may implement the method 900.

At operation 910, the detection system 170 obtains sensor data. For example, in one or more embodiments the camera 126 captures one or more images and the LIDAR sensor 124 (or other depth sensor, e.g., RADAR sensor 123) captures one or more corresponding depth images.

At operation 920, the detection system 170, e.g., detection module 220, determines that at least a portion of each image in a set of images captured by the camera 126 indicates a flat surface of an external display in the environment. For example, the detection module 220 can detect a designated symbol in the portion of the set of images that indicates an external display, or can compare the camera images against one or more corresponding depth images captured by a depth sensor as described above to identify the presence of a flat surface external display.

At operation 930, the detection system 170, e.g., tracking module 230, tracks an object within the portion of the set of images (i.e., in the external display) to determine an active state ("state") of the object. The state of the object can include at least a trajectory estimate for the object. The tracking module 230 can determine the trajectory estimate based on image analysis of a sequence of images that have captured the object. The trajectory estimate can include an estimated speed of the object and, when the speed is greater than zero, an estimated direction of movement of the object.

The state of the object can further include a distance estimate to the object from the vehicle 100. When the object is at least partially visible to the depth sensor, the distance estimate can be determined according to a measured distance to the object based on a depth image. When the object is completely obscured, the distance estimate can be determined based on a distance to the external display measured according to a depth image.

At operation 940, the detection system 170, e.g., drive module 240, determines a recommended driving maneuver based at least in part on the determined state of the object. For example, in one implementation that drive module 240 can determine a predicted trajectory of the vehicle 100 (e.g., based on current navigational data of the vehicle 100), predict a collision with the object based on the state of the object and the predicted trajectory of the vehicle 100, and modify a planned trajectory of the vehicle 100 to avoid the collision, such that the recommended driving maneuver includes the modification to the planned trajectory.

In another example implementation, the drive module 240 can determine that the object is moving in an area that is not visible and modify a planned trajectory of the vehicle 100 to move at a limited maximum speed (e.g., 3 mph) until additional information can be obtained.

In yet another example implementation, the drive module 240 can determine that the object is stationary in an area that is not visible and that is also not in the path of the current planed trajectory of the vehicle 100. Accordingly, the drive module 240 can recommend proceeding with the currently set navigation plan.

Accordingly, the disclosed detection system 170 can improve the operation of a vehicle 100, particularly an autonomous vehicle or a vehicle that includes autonomous or semi-autonomous features that rely on sensor data, by detecting the presence of an external display in the vicinity of the vehicle 100, identifying and tracking objects based on information provided by the display, determining a state of the objects and whether the objects are obscured from direct detection, and determining an appropriate driving maneuver recommendation based at least in part on the state of the objects. In this manner the vehicle 100 can safely extract information from an external display on an obstructing vehicle and interpret the information to determine a safe course of action.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the detection system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the detection system 170, and/or the autonomous driving module(s) 160 may control some or all of these vehicle systems 140 and, thus, may be partially or fully autonomous.

The processor(s) 110, the detection system 170, and/or the autonomous driving module(s) 160 can be operatively connected to communicate with the various vehicle systems 140 and/or individual components thereof. For example, returning to FIG. 1, the processor(s) 110, the detection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the detection system 170, and/or the autonomous driving module(s) 160 may control some or all of these vehicle systems 140.

The processor(s) 110, the detection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the detection system 170, and/or the autonomous driving module(s) 160 can control the direction and/or speed of the vehicle 100. The processor(s) 110, the detection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the detection system 170 can be configured to determine travel path(s) and determine current autonomous driving maneuvers for the vehicle 100, future autonomous driving maneuvers and/or modifications to current autonomous driving maneuvers based on data acquired by the sensor system 120 and/or detection system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system of a vehicle, comprising:
a plurality of sensors configured to acquire information about an environment around the vehicle, the plurality of sensors including a camera to capture images of a scene within the environment;
one or more processors; and
a memory communicably coupled to the one or more processors and storing:
a detection module including instructions that when executed by the one or more processors cause the one or more processors to determine that at least a portion of each image in a set of images captured by the camera is of an external display in the environment, and that the external display presents an object that is a sub-portion within the portion;
a tracking module including instructions that when executed by the one or more processors cause the one or more processors to track the object that is the sub-portion within the portion that is of the external display and determine a state of the object, the state including at least a trajectory estimate for the object; and
a drive module including instructions that when executed by the one or more processors cause the one or more processors to determine a recommended driving maneuver based at least in part on the state of the object.

2. The detection system of claim 1, wherein the detection module further includes instructions to determine that the portion of each image in the set of images indicates the external display based at least in part on detecting a symbol in the portion of each image in the set of images, wherein the symbol indicates a displayed image.

3. The detection system of claim 1, wherein:
the plurality of sensors further includes at least a depth sensor to capture depth images of the scene corresponding with the images captured by the camera; and
the detection module further includes instructions to determine that the portion of each image in the set of image indicates the external display based at least in part on a comparison of the depth images against the corresponding images captured by the camera.

4. The detection system of claim 3, wherein the instructions to determine the state of the object further include instructions to:
determine that a portion of the object is at least partially visible to the depth sensor; and
determine a distance to the object based on the portion of the object, wherein the state further includes the distance.

5. The detection system of claim 3, wherein the instructions to determine the state of the object further include instructions to:

determine a distance to the external display;
determine that no portion of the object is visible to the depth sensor; and
determine an estimate minimum distance to the object based on the distance to the external display, wherein the state further includes the estimate minimum distance.

6. The detection system of claim 1, wherein the trajectory estimate includes an estimated speed of the object and, when the speed is greater than zero, an estimated direction of movement of the object.

7. The detection system of claim 1, wherein the drive module further includes instructions to determine the recommended driving maneuver by:
determining a predicted trajectory of the vehicle;
predicting a collision with the object based on the state of the object and the predicted trajectory of the vehicle; and
modifying a planned trajectory of the vehicle to avoid the collision, wherein the recommended driving maneuver includes a modification to the planned trajectory.

8. A method of generating a driving maneuver recommendation for a vehicle having a plurality of sensors configured to acquire information about an environment around the vehicle, the sensors including at least a camera to capture one or more images of a scene within the environment, comprising:
determining that at least a portion of each image in a set of images captured by the camera is of an external display in the environment, and that the external display presents an object that is a sub-portion within the portion;
tracking the object that is the sub-portion within the portion that is of the external display to determine a state of the object, the state including at least a trajectory estimate for the object; and
determining a recommended driving maneuver based at least in part on the state of the object.

9. The method of claim 8, further comprising:
detecting a designated symbol in the portion of each image in the set of images; and
determining that the portion of each image in the set of images indicates the external display based at least in part on a detection of the designated symbol.

10. The method of claim 8, further comprising:
capturing, with at least one depth sensor, depth images of the scene corresponding with the images captured by the camera, the depth sensor being one of the plurality of sensors; and
determining that the portion of each image in the set of images indicates the external display based at least in part on a comparison of the depth images against the corresponding images captured by the camera.

11. The method of claim 10, wherein the determining the state of the object further comprises:
determining that a portion of the object is at least partially visible to the depth sensor; and
determining a distance to the portion of the object based on information from the depth sensor, wherein the state of the object further includes the distance to the portion of the object.

12. The method of claim 10, wherein the determining the state of the object further comprises:
determining a distance to the external display;
determining that no portion of the object is visible to the depth sensor; and
determining an estimate minimum distance to the object based on the distance to the external display, wherein the state of the object further includes the estimate minimum distance.

13. The method of claim 8, wherein the trajectory estimate includes an estimated speed of the object and, when the speed is greater than zero, an estimated direction of movement of the object.

14. The method of claim 8, wherein the determining the recommended driving maneuver further comprises:
determining a predicted trajectory of the vehicle;
predicting a collision with the object based on the state of the object and the predicted trajectory of the vehicle; and
modifying a planned trajectory of the vehicle to avoid the collision, wherein the recommended driving maneuver includes a modification to the planned trajectory.

15. A non-transitory computer-readable medium for generating a driving maneuver recommendation for a vehicle having a plurality of sensors configured to acquire information about an environment around the vehicle, the sensors including at least a camera to capture one or more images of a scene within the environment, including instructions that, when executed by one or more processors, cause the one or more processors to:
determine that at least a portion of each image in a set of images captured by the camera is of an external display in the environment, and that the external display presents an object that is a sub-portion within the portion;
track the object that is the sub-portion within the portion that is of the external display to determine a state of the object, the state including at least a trajectory estimate for the object; and
determine a recommended driving maneuver based at least in part on the state of the object.

16. The non-transitory computer-readable medium of claim 15, further including instructions to:
detect a designated symbol in the portion of each image in the set of images; and
determine that the portion of each image in the set of images indicates the external display based at least in part on the detection of the designated symbol.

17. The non-transitory computer-readable medium of claim 15, further including instructions to:
capture, with at least one depth sensor, depth images of the scene corresponding with the images captured by the camera, the depth sensor being one of the plurality of sensors; and
determine that the portion of the image indicates the external display based at least in part on a comparison of the depth images against the corresponding images captured by the camera.

18. The non-transitory computer-readable medium of claim 17, wherein the instructions to determine the state of the object further comprises:
instructions to determine that a portion of the object is at least partially visible to the depth sensor; and
instructions to determine a distance to the portion of the object based on information from the depth sensor, wherein the state of the object further includes the distance to the portion of the object.

19. The non-transitory computer-readable medium of claim 17, wherein the instructions to determine the state of the object further comprises:
instructions to determine a distance to the external display;

instructions to determine that no portion of the object is visible to the depth sensor; and instructions to determine an estimate minimum distance to the object based on the distance to the external display, wherein the state of the object further includes the estimate minimum distance.

20. The non-transitory computer-readable medium of claim 15, further including instructions to determine the recommended driving maneuver by:

determining a predicted trajectory of the vehicle;

predicting a collision with the object based on the state of the object and the predicted trajectory of the vehicle; and modifying a planned trajectory of the vehicle to avoid the collision, wherein the recommended driving maneuver includes the a modification to the planned trajectory.

* * * * *